US010700836B2

(12) United States Patent
Soong et al.

(10) Patent No.: US 10,700,836 B2
(45) Date of Patent: Jun. 30, 2020

(54) MULTICARRIER UPLINK DATA WITH SINGLE CARRIER UPLINK CONTROL

(71) Applicant: Futurewei Technologies, Inc., Plano, TX (US)

(72) Inventors: Anthony Soong, Plano, TX (US); Philippe Sartori, Plainfield, IL (US); Weimin Xiao, Hoffman Estates, IL (US); Mazin Al-Shalash, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 19 days.

(21) Appl. No.: 15/068,078

(22) Filed: Mar. 11, 2016

(65) Prior Publication Data
US 2017/0264401 A1 Sep. 14, 2017

(51) Int. Cl.
*H04L 12/801* (2013.01)
*H04L 5/14* (2006.01)
(Continued)

(52) U.S. Cl.
CPC ............ *H04L 5/005* (2013.01); *H04L 5/0053* (2013.01); *H04W 72/0413* (2013.01);
(Continued)

(58) Field of Classification Search
CPC ..... H04L 5/005; H04L 5/0053; H04L 5/0048; H04W 72/0413; H04W 72/0446
See application file for complete search history.

(56) References Cited

U.S. PATENT DOCUMENTS

| 2010/0098012 A1* | 4/2010 | Bala ................. H04W 72/0446 370/329 |
| 2011/0176498 A1 | 7/2011 | Montojo et al. |

(Continued)

FOREIGN PATENT DOCUMENTS

| CN | 101540648 A | 9/2009 |
| CN | 102474405 A | 5/2012 |

(Continued)

OTHER PUBLICATIONS

PCT/CN2017/078249, ISR, May 31, 2017.
(Continued)

*Primary Examiner* — Faruk Hamza
*Assistant Examiner* — Abusayeed M Haque
(74) *Attorney, Agent, or Firm* — Slater Matsil, LLP

(57) ABSTRACT

The disclosure relates to technology for communicating data and control information on an uplink channel in a wireless communication system. A frame is constructed to communicate symbols between a base station and user equipment, and zones are configured for an uplink channel in an uplink subframe using a signaling message. A first zone in the uplink channel is configured as a physical uplink control channel (PUCCH) for transmission of control information and a second zone is configured as a physical uplink shared channel (PUSCH) for transmission of data information. The PUCCH zone configuration is transmitted to the user equipment by the base station, control information is received by the base station as uplink control information (UCI) on the PUCCH resource using a single carrier modulation, such as SC-FDMA, and the data is received at the base station on the PUSCH resource using a multicarrier modulation, such as OFDM.

19 Claims, 13 Drawing Sheets

(51) Int. Cl.
*H04W 84/18* (2009.01)
*H04L 29/06* (2006.01)
*H04L 1/00* (2006.01)
*H04L 5/00* (2006.01)
*H04W 72/04* (2009.01)
*H04L 27/26* (2006.01)

(52) U.S. Cl.
CPC .......... *H04L 5/0048* (2013.01); *H04L 27/26* (2013.01); *H04W 72/0446* (2013.01)

(56) References Cited

U.S. PATENT DOCUMENTS

| | | | | |
|---|---|---|---|---|
| 2011/0287804 A1* | 11/2011 | Seo | ..................... | H04W 52/146 |
| | | | | 455/522 |
| 2012/0120906 A1 | 5/2012 | Pan et al. | | |
| 2012/0263060 A1* | 10/2012 | Suzuki | ................ | H04W 52/365 |
| | | | | 370/252 |
| 2013/0039332 A1* | 2/2013 | Nazar | ................... | H04W 72/04 |
| | | | | 370/330 |
| 2013/0163533 A1* | 6/2013 | Anderson | ............. | H04W 72/04 |
| | | | | 370/329 |
| 2014/0185483 A1* | 7/2014 | Kim | ..................... | H04W 24/02 |
| | | | | 370/252 |
| 2014/0198744 A1* | 7/2014 | Wang | ................. | H04W 52/325 |
| | | | | 370/329 |
| 2014/0219202 A1* | 8/2014 | Kim | ..................... | H04L 1/1861 |
| | | | | 370/329 |
| 2014/0293843 A1* | 10/2014 | Papasakellariou | .. | H04W 72/042 |
| | | | | 370/280 |
| 2014/0334320 A1* | 11/2014 | Liu | ..................... | H04W 52/242 |
| | | | | 370/252 |
| 2016/0205679 A1* | 7/2016 | Yoo | ........................ | H04L 1/0026 |
| | | | | 370/329 |
| 2016/0226639 A1* | 8/2016 | Xiong | ..................... | H04B 1/713 |
| 2016/0227557 A1* | 8/2016 | Fanous | ............. | H04W 72/1215 |
| 2016/0302180 A1* | 10/2016 | Nory | ................... | H04L 27/2601 |
| 2016/0309510 A1* | 10/2016 | Wong | ....................... | H04W 4/70 |
| 2017/0054531 A1 | 2/2017 | Chae et al. | | |
| 2017/0164345 A1* | 6/2017 | Goto | ................. | H04W 72/0446 |
| 2017/0171866 A1* | 6/2017 | Cheng | ................... | H04L 5/0092 |
| 2017/0188311 A1* | 6/2017 | Hwang | ............. | H04W 72/0413 |
| 2017/0290008 A1* | 10/2017 | Tooher | .................. | H04L 1/0007 |

FOREIGN PATENT DOCUMENTS

| | | |
|---|---|---|
| WO | 2015122734 A1 | 8/2015 |
| WO | 2016004634 A1 | 1/2016 |

OTHER PUBLICATIONS

3GPP TS 36.211, V8.4.0, "3rd GenerationPartnership Project; Technical Specification Group Radio Access Network; EvolvedUniversal Terrestrial Radio Access (E-UTRA);Physical Channels and Modulation (Release8)", Sep. 2008. XP050377536.

R1-084404, Motorola: "Impact of Introducing OFDMA Option to LTE-A UL Access",3GPP Draft;Nov. 2008. XP050317666.

3rd Generation Partnership Project; Technical Specification Group Radio Access Network; Evolved Universal Terrestrial Radio Access (E-UTRA); Physical layer procedures (Release 10), 3GPP TS 36.213 v10.1.0, (Mar. 2011), 115 pages.

* cited by examiner

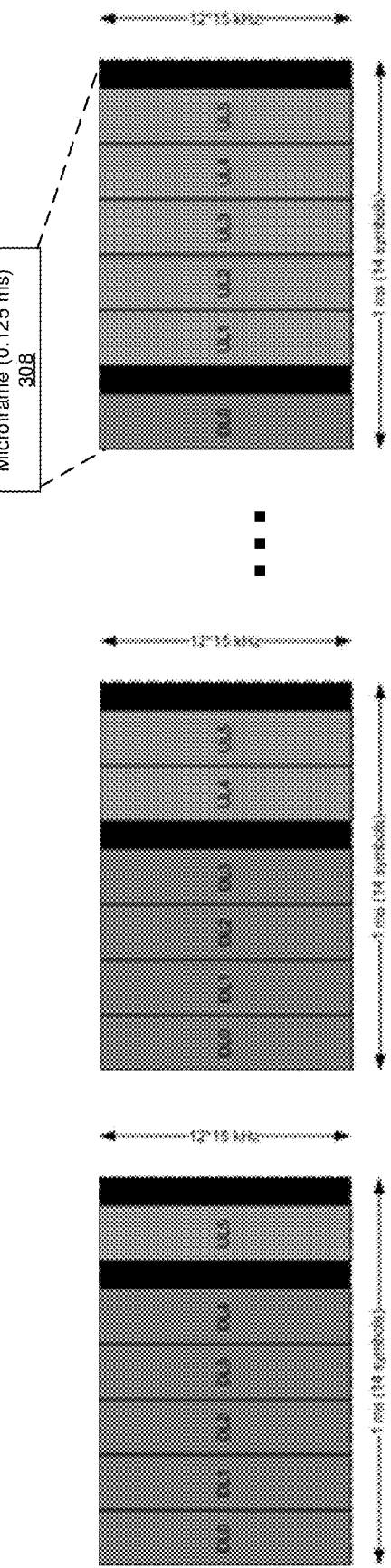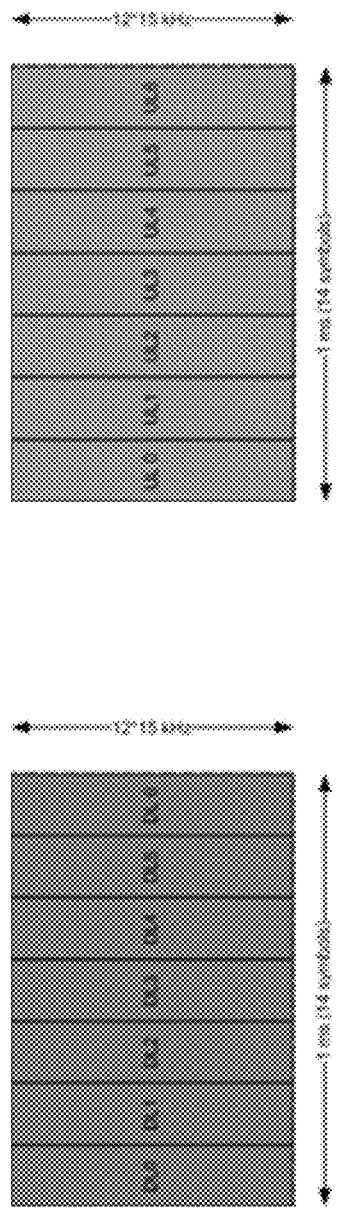

MULTICARRIER UPLINK DATA WITH SINGLE CARRIER UPLINK CONTROL

BACKGROUND

The LTE-A (Long Term Evolution-Advanced) is a further evolved and enhanced system based on a 3GPP LTE (3rd Generation Partnership Project Long Term Evolution) system. In this system, the downlink radio access technique may be Orthogonal Frequency Division Multiplexing (OFDM) or Orthogonal Frequency Division Multiple Access (OFDMA), and the uplink radio access technique will be Single-Carrier FDMA (SC-FDMA) which is a type of a linearly pre-coded OFDMA. The uplink system band has a structure where a Physical Uplink Control Channel (PUCCH) is used for transferring uplink control messages where there is no uplink user traffic, and a Physical Uplink Shared Channel (PUSCH) is used for transmission of uplink user traffic. Additional control messages may be transmitted in resources initially allocated to the PUSCH. The PUCCH carries uplink control information, such as ACK/NACK messages, channel quality indicators (CQI), scheduling request indicators (SRI), channel rank indicators, downlink pre-coding information, etc.

BRIEF SUMMARY

In one embodiment, there is a method of communicating data and control information on an uplink channel in a wireless communication system, including constructing a frame to communicate symbols between a base station and user equipment, the frame including an uplink subframe to communicate the symbols from the user equipment to the base station; configuring one or more zones of an uplink channel in the uplink subframe using a signaling message, wherein a first zone in the uplink channel is configured as a physical uplink control channel (PUCCH) for transmission of control information and a second zone is configured as a physical uplink shared channel (PUSCH) for transmission of data information; transmitting the PUCCH zone configuration to the user equipment; receiving the control information as uplink control information (UCI) on the PUCCH resource using a single carrier modulation and receiving the data on the PUSCH resource using a multicarrier modulation; and decoding the UCI on the PUCCH resource in the PUCCH zone using the single carrier modulation and decoding the data on the PUSCH resource in the PUSCH zone using multi-carrier modulation.

In another embodiment, there is a node communicating data and control information on an uplink channel in a wireless communication system, including a memory storage comprising instructions; and one or more processors coupled to the memory that execute the instructions to: construct a frame to communicate symbols between a base station and user equipment, the frame including an uplink subframe to communicate the symbols from the user equipment to the base station; configure one or more zones of an uplink channel in the uplink subframe using a signaling message, wherein a first zone in the uplink channel is configured as a physical uplink control channel (PUCCH) for transmission of control information and a second zone is configured as a physical uplink shared channel (PUSCH) for transmission of data information; transmit the PUCCH zone configuration to the user equipment; receive the control information as uplink control information (UCI) on the PUCCH resource using a single carrier modulation and receiving the data on the PUSCH resource using a multi-carrier modulation; and decode the UCI on the PUCCH resource in the PUCCH zone using the single carrier modulation and decoding the data on the PUSCH resource in the PUSCH zone using multi-carrier modulation.

In still another embodiment, there is a non-transitory computer-readable medium storing computer instructions for identifying a root cause of anomalous behavior in a communications network, that when executed by one or more processors, perform the steps of constructing a frame to communicate symbols between a base station and user equipment, the frame including an uplink subframe to communicate the symbols from the user equipment to the base station; configuring one or more zones of an uplink channel in the uplink subframe using a signaling message, wherein a first zone in the uplink channel is configured as a physical uplink control channel (PUCCH) for transmission of control information and a second zone is configured as a physical uplink shared channel (PUSCH) for transmission of data information; transmitting the PUCCH zone configuration to the user equipment; receiving the control information as uplink control information (UCI) on the PUCCH resource using a single carrier modulation and receiving the data on the PUSCH resource using a multicarrier modulation; and decoding the UCI on the PUCCH resource in the PUCCH zone using the single carrier modulation and decoding the data on the PUSCH resource in the PUSCH zone using multi-carrier modulation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

FIGS. 4A-4E illustrate subframes arranged into different microframe configurations.

DETAILED DESCRIPTION

The disclosure relates to technology for transmitting data in an uplink channel of a wireless communication system in which a multicarrier modulation, such as OFDM, of data occurs on a data channel, such as a physical uplink shared channel PUSCH, and single carrier modulation, such as SC-FDMA, of control information occurs on a control channel, such as PUCCH.

A frame is constructed to communicate symbols between a base station and user equipment, and zones are configured for an uplink channel in an uplink subframe, in one embodiment, using a signaling message. In another embodiment, zones may be pre-configured. A first zone in the uplink channel is configured as a PUCCH for transmission of control information and a second zone is configured as a PUSCH for transmission of data information. The two zones may overlap. The PUCCH zone configuration is transmitted to the user equipment by the base station, control information is received by the base station as uplink control information (UCI) on the PUCCH resource using a single carrier modulation, such as SC-FDMA, and the data is received at the base station on the PUSCH resource using a multicarrier modulation, such as OFDM.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Figure 1:
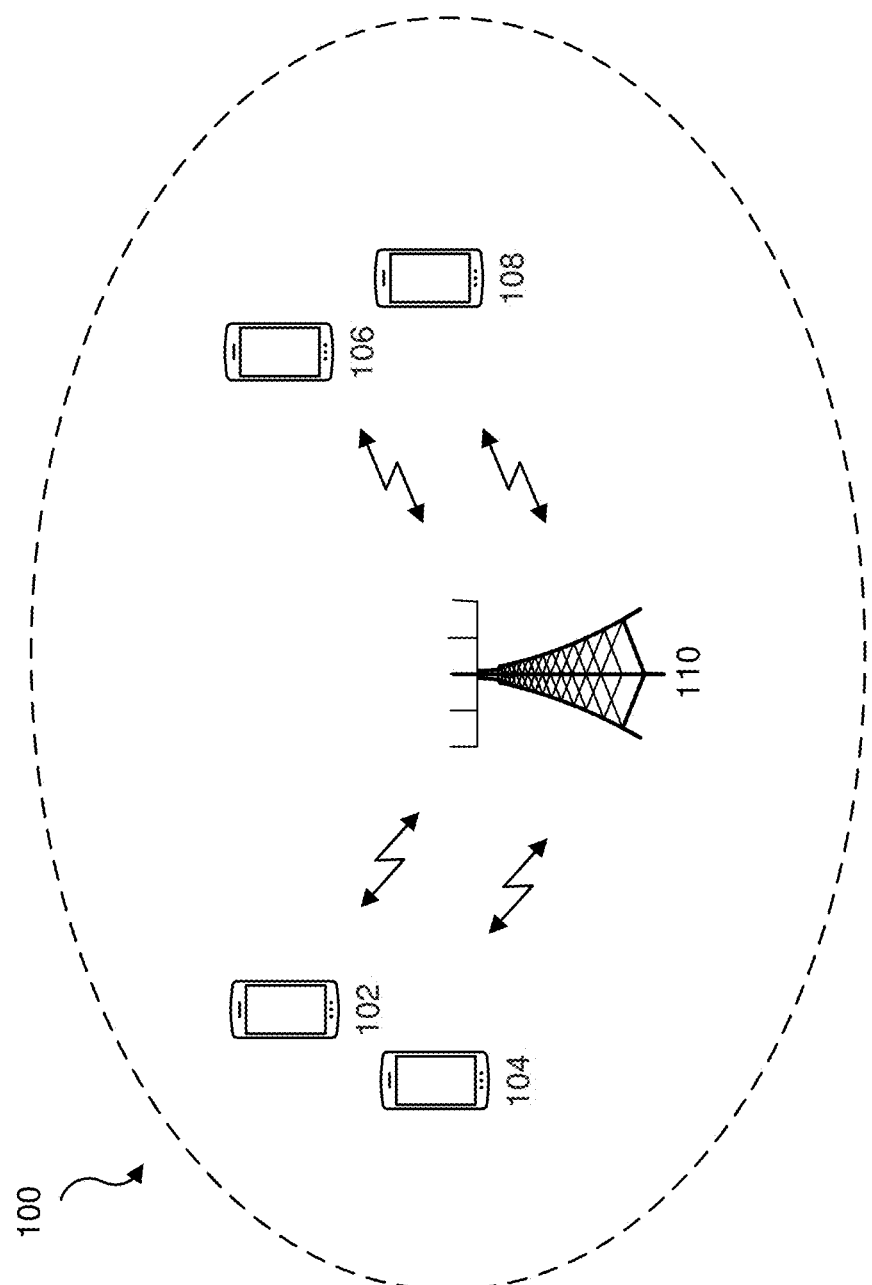
FIG. 1 illustrates an architecture of a wireless communication system in which the present technology may be implemented.

FIG. 1 illustrates an architecture of a wireless communication system in which the present technology may be implemented. The network 100 may comprise any wired or wireless network that provides communication connectivity for devices. The network 100 may include various cellular network and packet data network components such as a base station (BS), a node-B, a base station controller (BSC), a radio network controller (RNC), a service GPRS support node (SGSN), a gateway GPRS support node (GGSN), a WAP gateway, mobile switching center (MSC), short message service centers (SMSC), a home location registers (HLR), a visitor location registers (VLR), an Internet protocol multimedia subsystem (IMS), and/or the like. Although only one network is illustrated, multiple networks may be employed.

The network 100 may employ any of the known and available communication protocols, such as Code Division Multiple Access (CDMA), Global System for Mobile communications (GSM), Universal Mobile Telecommunications System (UMTS), Long Term Evolution (LTE), LTE-Advanced, or any other network protocol that facilitates communication between network 100 and network enabled devices resulting in a communications network. The network 100 may also be compatible with future mobile communication standards including, but not limited to, future evolutions of LTE, future evolutions of WIMAX, 5G cellular systems, WiFi evolutions. The network 100 may include other types of devices and nodes for receiving and transmitting voice, data, and combination information to and from radio transceivers, networks, the Internet, and other content delivery networks. The network may support communication from any portable or non-portable communication device having network connectivity function, such as a cellular telephone, a computer, a tablet, and the like, can operatively connect to the communication network 100. One evolution of LTE that is of particular interest is Wideband LTE (WB-LTE), wherein the system occupies a larger bandwidth, operates at a low latency, but is designed with the same principles as LTE.

Network enabled devices, such as user equipment (UE) 102 to 108 as illustrated in FIG. 1 (collectively or individually referred to herein as UE) may include a processor, a memory (which may or may not be non-transitory), a transceiver, and an antenna (not shown). In particular embodiments, some or all of the functionality described herein as being provided by the UE may be provided by the UE processor executing instructions stored on the memory. Alternative embodiments of the UE may include additional components that may be responsible for providing certain aspects of the UE's functionality, including any of the functionality necessary to support the embodiments of the present disclosure.

Components in the network 100, such as base station 110, may be configured for wireless communication according to the aforementioned protocols and to perform the method and processes according to the disclosed embodiments, and in particular, to perform an uplink channel arrangement for LTE or wideband LTE (WB-LTE) where the data channel PUSCH relies on OFDM, and the control channel PUCCH relies on single carrier frequency-division multiple access (SC-FDMA). In one embodiment, the base station 110 may include a receiver and transmitter (not shown), configured for receiving from and transmitting to a wireless signal from one or more UEs. Additionally, the base station 110 may optionally include a memory (not shown), which may comprise a physical device utilized to store data or a program, i.e., a sequence of instructions, on a temporary or permanent basis.

Thus, it is apparent from the description above that all or some of the above and below described methods and processes may be performed in the network enables devices and/or components and may be implemented through one or more processors, together with a computer program product for performing at least some of described methods and processes.

Figure 2:
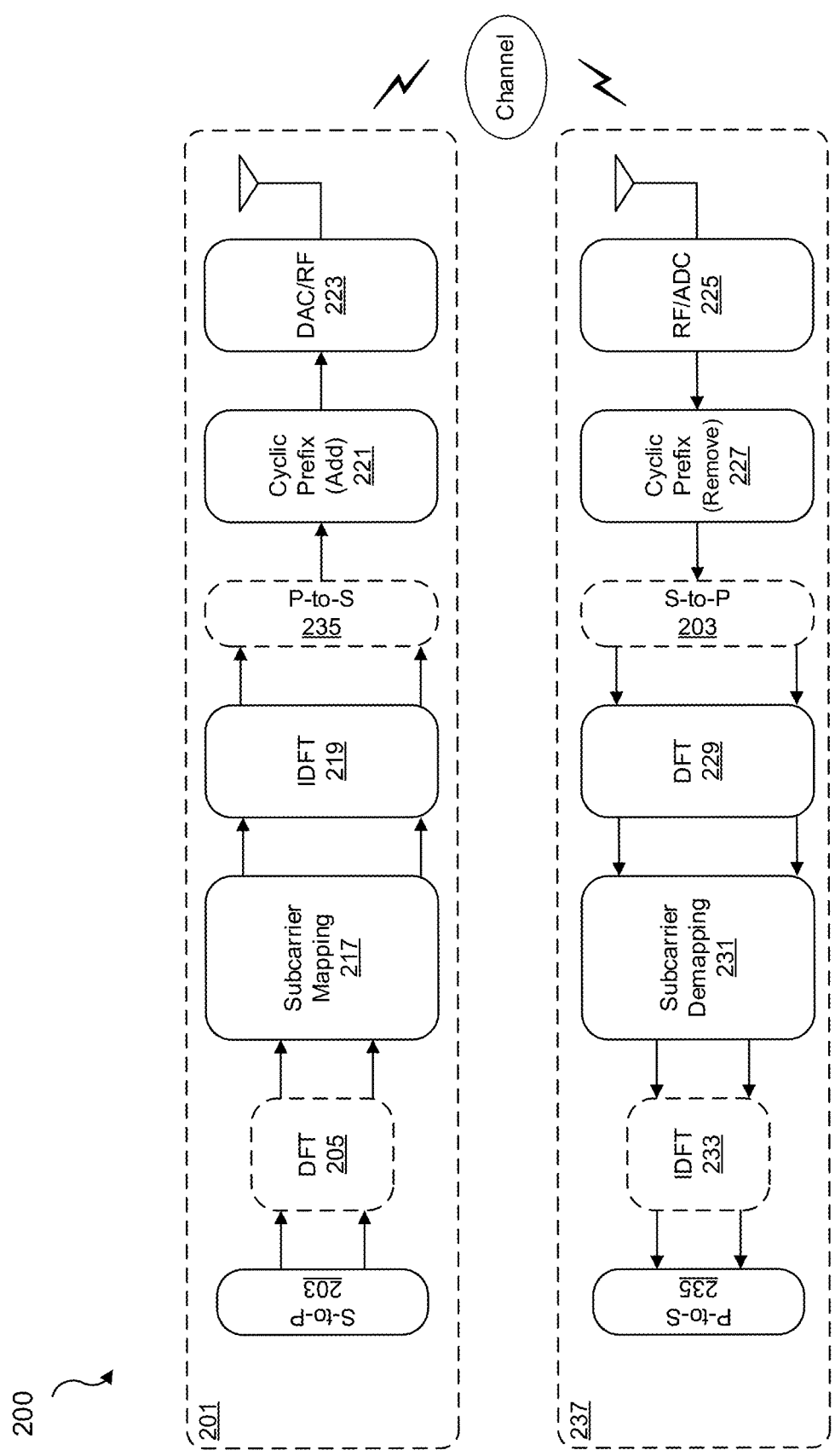
FIG. 2 illustrates a basic structure of an OFDM and SC-FDMA transmitter and receiver.

FIG. 2 illustrates a structure of an OFDM and SC-FDMA transmitter and receiver for use with the embodiments of the present disclosure. Although the disclosed embodiment is discussed with respect to SC-FDMA in the uplink (UL) and downlink (DL) directions, the OFDM and SC-FDMA transmitter and receiver structure 200 may equally apply to an LTE system that utilizes a multicarrier modulation in the uplink direction (discussed below). The description below is consistent with well-known techniques in the industry.

In the SC-FDMA transmitter 201, modulated symbols to be transmitted are transferred from a serial to parallel form (S-to-P block 203). The parallel signal is then transformed into a frequency domain through discrete Fourier transform (DFT) 205. Control and traffic data symbols are allocated to corresponding frequency resource elements (REs) in a subcarrier mapping engine 217 according to a determined criterion. The RE may be a sub-carrier or a virtual sub-carrier, as used within the context of SC-FDMA transmission. An inverse DFT (IDFT) 219 is calculated, and the signal is converted from parallel-to-serial form (P-to-S block 235). A cyclic prefix may be added in cyclic prefix engine 221, and the signal is transformed into an analog form and transmitted through radio frequency parts of the transmitter 201 using a digital-to-analog converter (DAC/RF) 223.

In the SC-FDMA receiver 237, the radio signal is received through an antenna and RF parts of the receiver and the received signal is transformed into a digital signal using an analog-to-digital converter (RF/ADC) 225. The cyclic prefix may be removed in cyclic prefix engine 227, and the signal is converted from serial-to-parallel (S-to-P) form prior to discrete Fourier transform (DFT) 229. The control and traffic data symbols are extracted from their REs in the subcarrier demapping engine 231 before IDFT 233 and parallel-to-serial conversion (P-to-S 235) are performed.

For an LTE system supporting OFDM in the uplink direction, the SC-FDMA transmitter and receiver structure 200 may be modified to omit DFT 205 in the transmitter 201 and IDFT 233 in the receiver 237 to provide an OFDM transmitter and receiver structure 200. Accordingly, the transmitter 201 may comprise a controller controlling short-circuiting of the DFT 205, and the receiver 237 may comprise a corresponding controller controlling short-circuiting of the IDFT 233. As appreciated, the short-circuiting of the DFT 205 and IDFT 233 is represented by the dashed lines around the component in the diagram.

Figure 3:
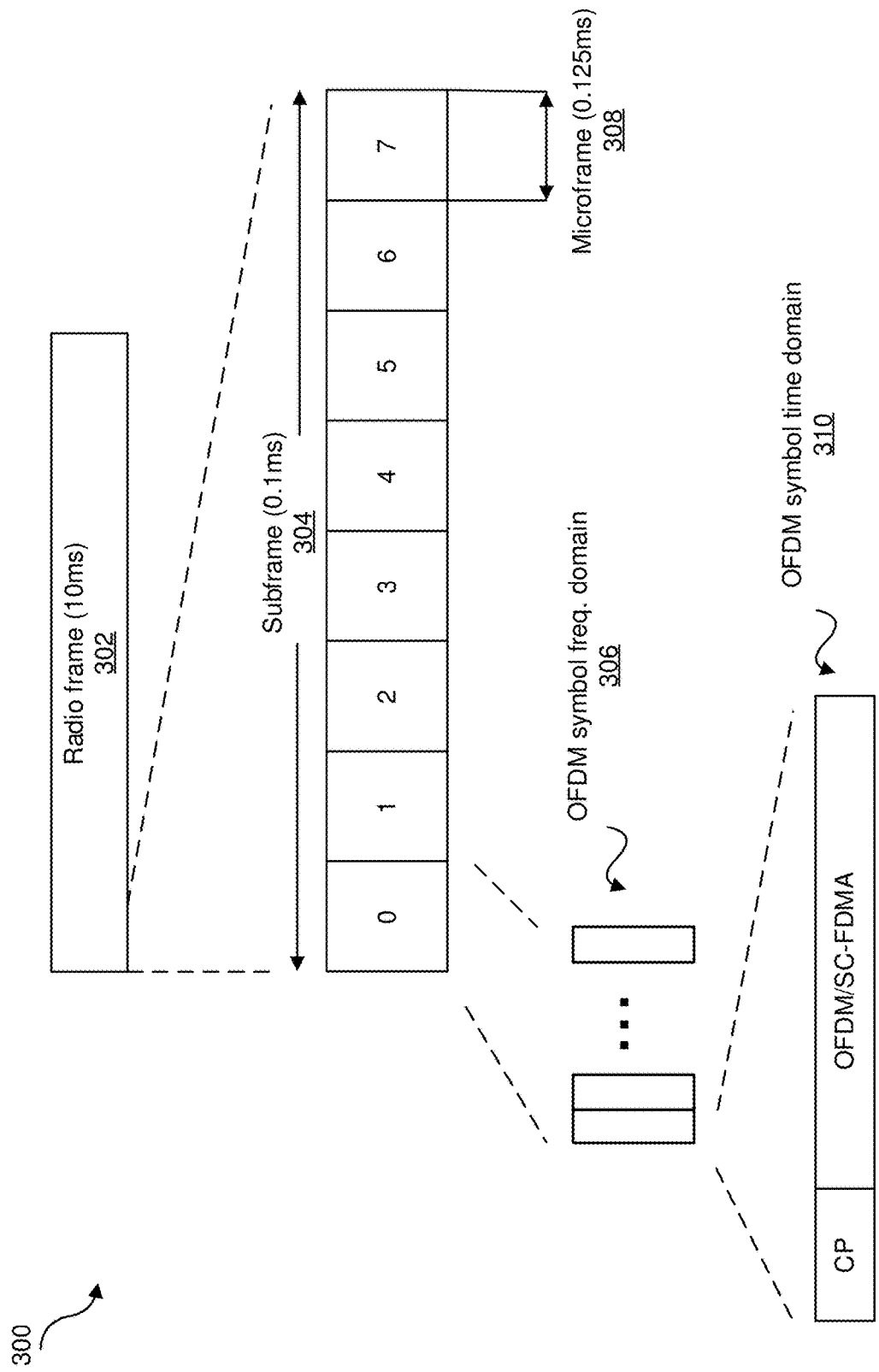
FIG. 3 illustrates radio frame structure of an LTE system with microframes in accordance with the present disclosure.

FIG. 3 illustrates radio frame structure 300 of an LTE system with microframes 308 in accordance with the present disclosure. The current spectrum allocation for cellular systems is becoming inadequate in capacity as the number of users and traffic increases. To increase the amount of spectrum available for cellular usage, the physical layer of LTE to may be modified to operate with larger bandwidths.

In the figure, a radio frame 302 is composed of ten subframes 304, and a single subframe is composed of two slots (not shown). A time taken for one subframe 304 to be transmitted is called a transmission time interval (TTI). A TTI may be a scheduling unit for data transmission. For example, a length of one radio frame 302 may be 10 ms, a length of one subframe 304 may be 1 ms, and a length of one slot may be 0.5 ms.

One slot includes a plurality of orthogonal frequency division multiplexing (OFDM) symbols in a time domain 310 and a plurality of subcarriers in a frequency domain 306. In LTE, for example, a base station, such as 110, uses OFDMA as an accessing method in a DL channel. OFDM symbols 306 are used to express a symbol period. Symbols may be referred to depending on a particular multiple-access scheme, and are not limited to OFDM symbols. For example, in an UL channel in which a UE transmits data to a BS, a SC-FDMA may be used as a multi-access scheme. Accordingly, the symbols are referred to as SC-FDMA symbols.

The wireless communication system may use a frequency division duplex (FDD) scheme, a TDD scheme, or the like, as a duplexing scheme. In the disclosed embodiment, the WB-LTE system is TDD. For example, bandwidths in the 20~320 MHz range could be used to deploy a WB-LTE system. However, it is appreciated that a FDD or other duplexing scheme may be employed.

In the enhanced wide bandwidth LTE system, a desired feature is to enable low latency. Embodiments described below describe a microframe structure to enable low latency. As depicted in the embodiment, a subframe 304 is divided into several microframes 308. In this example, there are 8 microframes 308 in one subframe 304; the duration of each microframe 308 is 125 µs. The microframe 308 can be configured for either uplink or downlink transmission.

For TDD, a special microframe 308 may be defined and capable of supporting uplink and downlink transmissions. Another type of a special microframe 308 has a downlink portion and guard period. There can be a PDCCH or enhanced PDCCH (EPDCCH) in each downlink microframe 308 and special microframe 308 for TDD. Each microframe 308 contains one or more orthogonal frequency division multiplex (OFDM) symbols.

In the frequency domain, each OFDM symbol 306 includes REs (subcarriers). The subcarrier spacing (frequency separation between adjacent subcarriers) can be, for example, 60 kHz. In the time domain, each OFDM symbol 310 has a cyclic prefix (CP) with $n_{CP}$ samples. Each symbol of the microframe 308 can have a different value for $n_{CP}$. In many realizations, the OFDM symbol 310 in the time domain can be generated by performing an inverse fast Fourier transform (IFFT) on the subcarriers. The last $n_{CP}$ samples of the IFFT output can be used for the cyclic prefix.

FIGS. 4A-4E illustrate subframes arranged in different microframe configurations. In order to accommodate a shorter TTI in a WB-LTE system, each subframe is divided into a number of microframes 308, where the length of a microframe 308 is 0.125 ms. There are a total of eight microframe 308 uplink/downlink configurations, namely, configurations 0-7, five of which (configurations 0, 1 and 5-7) are represented by FIGS. 4A-4E, respectively. The microframe 308 may include uplink and downlink symbols ($DL_0$-$DL_N$ and $UL_1$-$UL_N$) and may include a guard period to facilitate Rx/Tx switching. As illustrated in FIGS. 4A-4C (configurations 0, 1 and 5), a guard time symbol (black boxes) are positioned within the microframe 308 to separate uplink and downlink symbols. FIGS. 4D and 4EA are all uplink or downlink symbols, respectively, and do not include and guard time symbols.

The microframe configuration needs to be signaled to the UE. There are several possible ways of signaling. First, if the uplink-downlink configuration does not change very often, it could be communicated by radio resource configuration (RRC) signaling, either dedicated (UE-specific) or common (broadcast). In the extreme case, the uplink-downlink configuration could be signaled using the master information block (MIB) transmitted in the physical broadcast channel (PBCH). In another embodiment, a channel similar to the physical control format indicator channel (PCFICH) can be used to indicate the uplink-downlink configuration. This similar channel could be sent on reserved resources on dedicated microframes 308 (e.g., microframe #0 of the subframe). In this example, the signaling can be sent every 1 ms. A slower rate can be used. In other embodiments, the signaling could be done by using sequences or using a downlink control information (DCI).

It is appreciated that while the microframes have been added to the LTE radioframe structure, the radioframe and subframe remain untouched (i.e., remain consistent with the structure of the existing LTE physical layer). Additionally, the number of symbols in a microframe may change based on, for example, radio operating conditions. For example, if a cyclic prefix is 1.2 µs, then a microframe may use seven symbols. If a cyclic prefix is 8.3 µs, then five symbols may be used in the microframe.

Figure 5A:
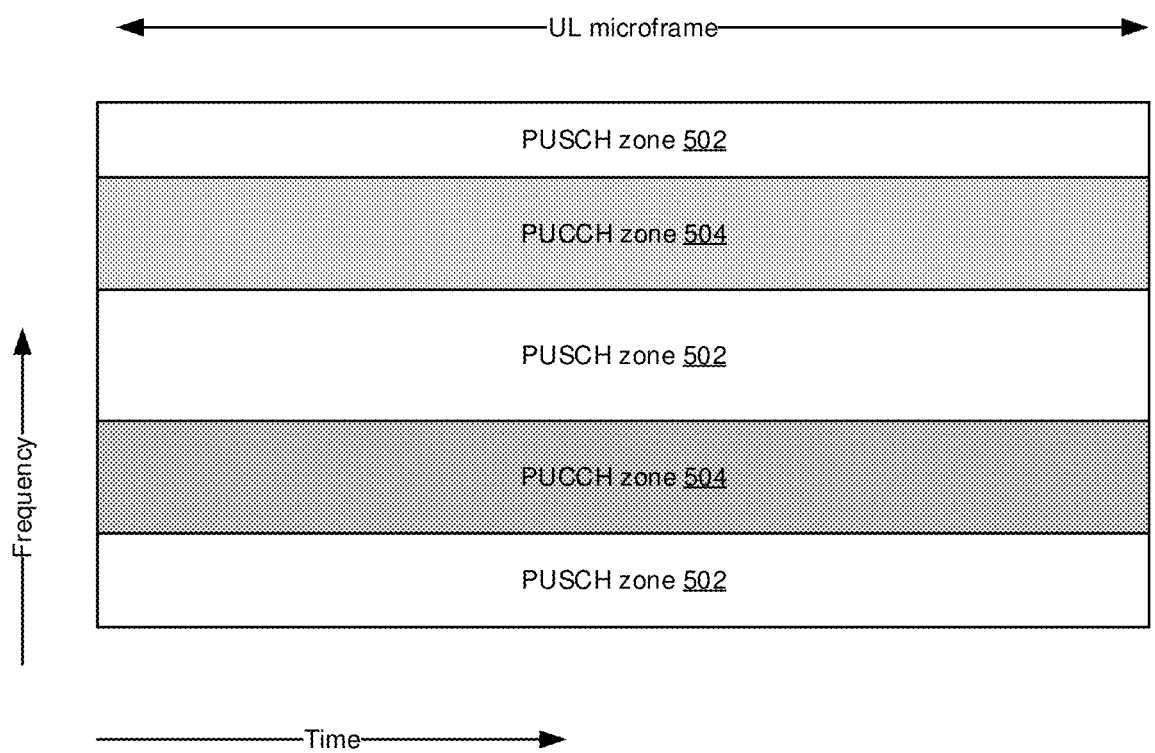
FIGS. 5A and 5B illustrate embodiments of an uplink microframe.
Figure 5B:
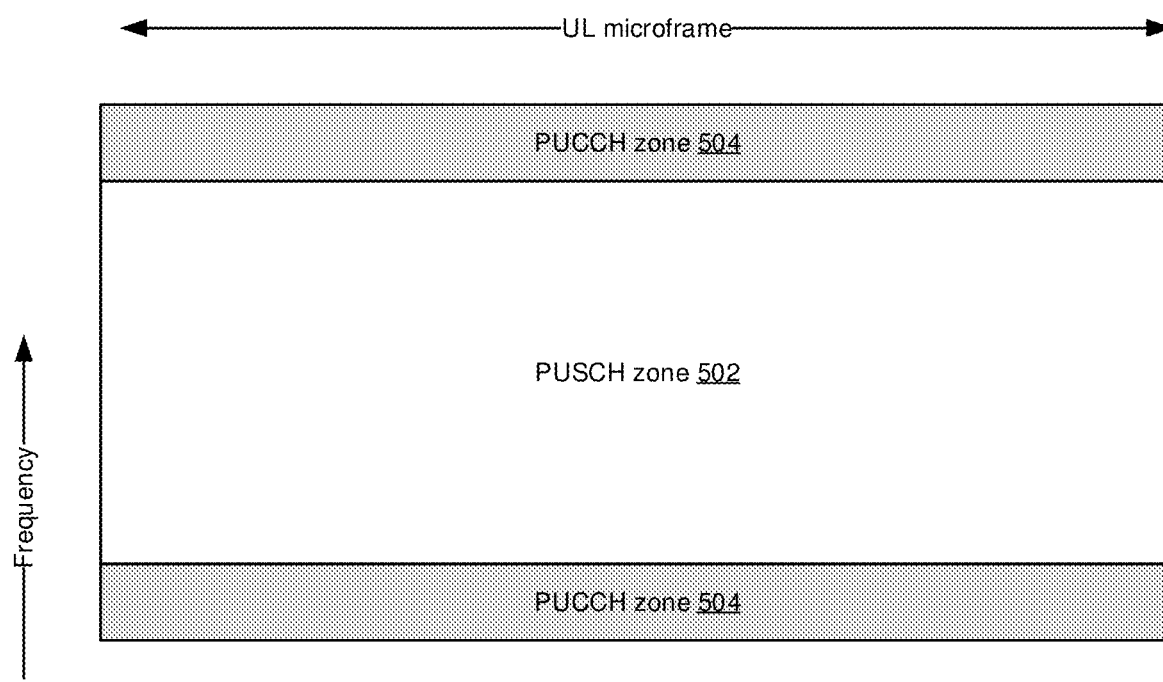

FIGS. 5A and 5B illustrate embodiment of an uplink microframe. As in current LTE standards for wireless communication, two channels can be multiplexed on the uplink channel: (1) the physical uplink shared channel (PUSCH), or data channel, may be used for transmitting data and higher layer control information (e.g., dedicated RRC signaling), and (2) the physical uplink control channel (PUCCH), or control channel, may be used for transmitting control information, such as HARQ A/N information, channel quality information, scheduling requests, etc. Additionally, the control information transmitted on the PUCCH is transmitted into an uplink channel information (UCI) message.

In one embodiment, when a UE has a PUSCH to transmit, the UCI is piggybacked onto the PUSCH. Otherwise, the PUCCH is only transmitted when the UE does not have any PUSCH.

In another embodiment, the PUSCH is transmitted using a multicarrier modulation (e.g., OFDM), and the associated control on the PUCCH is transmitted using a single carrier modulation (e.g., SC-FDMA). In an uplink microframe (e.g., FIG. 5A), one or more zones (illustrated as gray rows) are defined as to where to transmit the PUCCH. PUCCH is transmitted into these 504 zones using SC-FDMA. PUSCH are transmitted in the other zones 502 (illustrated as white rows) using OFDM.

Additionally, when the UCI is multiplexed with a single carrier (e.g., SC-FDMA) PUSCH, existing LTE mapping may be employed. When the PUSCH is encoded with a multicarrier modulation (e.g., OFDM), the UCI may be located according to one or more of the following: (1) UCI occupies a same RE as single carrier PUSCH, (2) UCI occupies the first symbol (or part of the first symbol) of the PUSCH, and (3) the UCI REs are placed in the resource block (RB) at known locations. A discussion of REs and RBs may be found below in more detail.

With continued reference to FIGS. 5A and 5B, the uplink microframe is described in more detail. An uplink microframe may be divided into a control region to which a physical uplink control channel (PUCCH) carrying uplink control information in the frequency domain is allocated and a data region to which a physical uplink shared channel (PUSCH) carrying user data.

According to 3GPP TS 36.213, section 10.1 (2011-04), incorporated herein by reference, the UE procedure for determining a physical uplink control channel assignment is disclosed. The PUCCH may have various formats. PUCCHs of different formats having different numbers of bits may be used in subframes according to modulation schemes used for PUCCH formats.

For example, PUCCH format 1 is used for transmission of a scheduling request (SR). PUCCH formats 1a and 1b are used for transmission of an ACK/NACK signal for HARQ. PUCCH format 2 is used for transmission of a CQI. PUCCH formats 2a and 2b are used for simultaneous transmission of CQI and ACK/NACK signal. When only an ACK/NACK signal is transmitted in a subframe, the PUCCH formats 1a and 1b are used, and when an SR is transmitted alone, the PUCCH format 1 is used. When SR and ACK/NACK are simultaneously transmitted, the PUCCH format 1 is used, and ACK/NACK signals are modulated and transmitted in resource allocated to SR.

The PUCCH zone 504 is generally configured by the network and is received from the UE by the eNB. The PUCCH zone 504 may be configured on a per-cell basis and sent using common RRC signaling (SIB message). Alternatively, the zone could be configured on a per-UE basis, and received by dedicated RRC signaling. The PUCCH format and mapping for a user may be according to an existing PUCCH format (e.g., 1A or 3), or according to a newly defined format.

From the eNB perspective, the PUCCH zone 504 may be shared between multiple UEs. Each UE may be allocated a single possible PUCCH resource (or PUCCH resources may be multiplexed, as explained below). The PUCCH resource may be derived from the first consecutive control channel elements (CCE)/enhanced CCE (ECCE) used by the PDCCH similar to LTE Rel-13.

In one embodiment, microframes could use the same structure as an existing LTE subframe, in which the PUCCH zone 504 is at edges of the bandwidth (shown in FIG. 5B). In an embodiment both microframe structures (structures depicted in FIGS. 5A and 5B) are used, the PUCCH zone 504 may be indicated, for example, by a bitmap and signaled with RRC signaling.

Figure 6A:
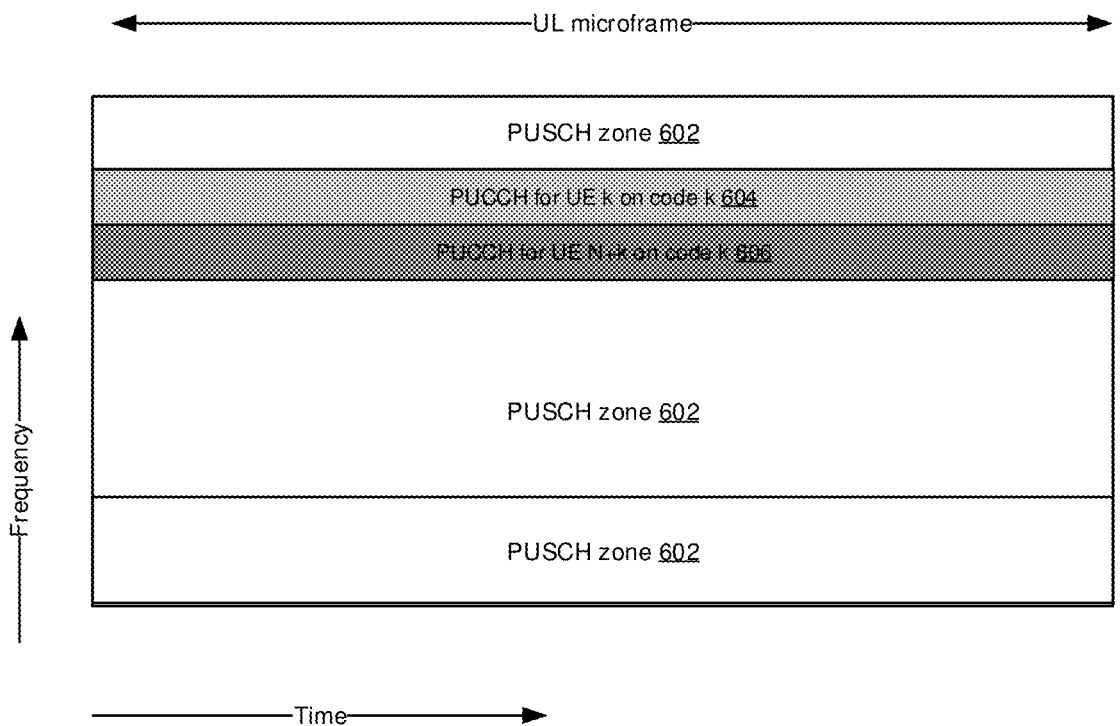
FIG. 6A-6D illustrate embodiments of multiplexing and mapping a PUCCH for multiple user equipment.

FIGS. 6A-6D illustrate embodiments of multiplexing and mapping a PUCCH for multiple user equipment. PUCCHs from different UEs may be time multiplexed and/or code multiplexed. One example of multiplexing PUCCHs from different UEs is illustrated in FIG. 6A. For example, channel state information (CSI) transmission from multiple UEs (e.g., UE k and UE N+k) may be multiplexed in a PUCCH (604 and 606). However, multiplexing in this manner establishes a trade-off between the payload size and the multiplexing capacity in order to control a respective UL overhead. It is also appreciated that all PUCCHs are not necessarily transmitted. For example, if there is no need to transmit control information, the UE may not transmit the PUCCH to the base station.

A PUCCH resource is defined by two parameters: a frequency resource, and a code resource. A frequency resource consists of two RBs and is referenced by its first RB frequency index (e.g., frequency index k). On the first slot, the PUCCH uses RB index k. On the second slot, the PUCCH uses RB index N−k, where N is the total number of frequency resources. In addition, spreading is used on each frequency resources so that more than one PUCCH can be multiplexed on the same frequency resource. The combination of frequency resource and spreading index is determined based on information received from the eNB, and by the control channel element (CCE) index of the first CCE occupied by the PDCCH to which the PUCCH is associated with (for ACK/NAK reporting).

Figure 6B:
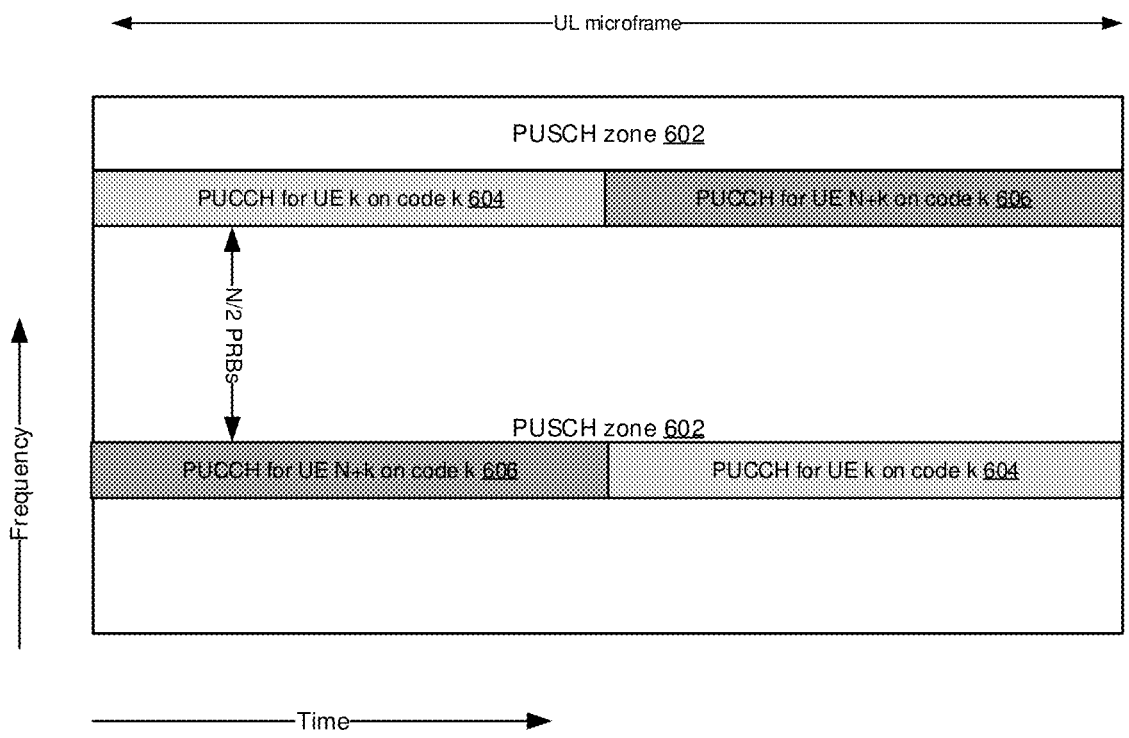
Figure 6C:
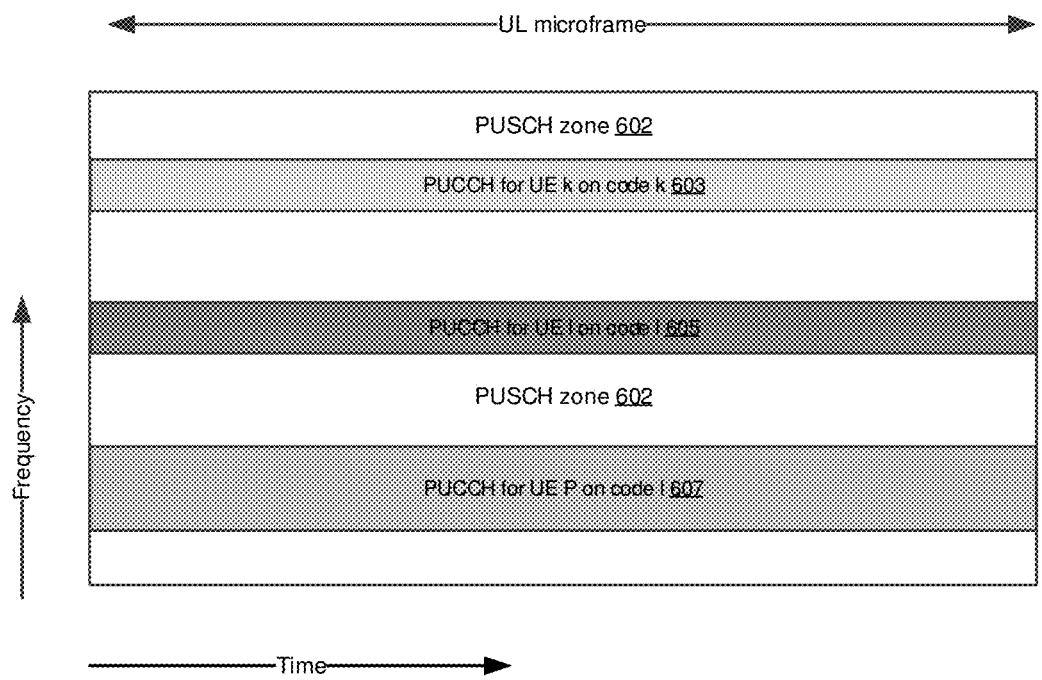

FIG. 6B illustrates an example of mapping PUCCH for multiple UEs using frequency hopping. In one embodiment, frequency hopping may occur on a per-slot basis. A simple solution is to use resource block RB index k in the first slot, and a physical resource block PRB index k+[N/2], where N is the total number of RBs. In such an example, at least two PUCCH zones (604, 606) need to be present, and can be mapped as shown in the figure. Thus, in the illustrated example, PUCCH for UE k (604) and PUCCH for UE N+k (606) are frequency hopped by dividing the microframe into two slots. If there is no slot structure, the PUCCH may be transmitted over two subframes or microframes. For example, a time resource may be used such that the PUCCH may be transmitted over two subframes or microframes, where the first subframe acts as the first slot and a second subframe acts as a second time slot.

Figure 6D:
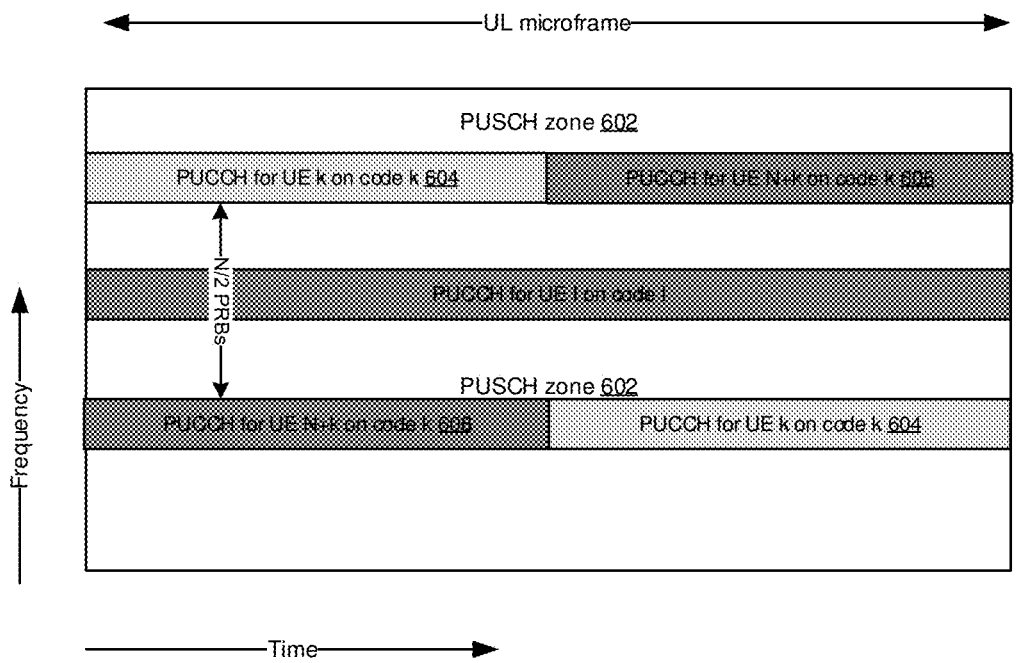

In alternative embodiments, PUCCHs from different UEs may be simultaneously sent at different locations with different codes, sizes, etc. (FIG. 6C) and different PUCCH types may coexist on the same subframe (FIG. 6D). It is appreciated that the disclosed embodiments are non-limiting, and that any number of subframe/microframe structures may exits.

Although the disclosed embodiments are described with reference to multiplexing two PUCCH formats (e.g., a single carrier and multicarrier), PUSCH having different formats could also be employed in a similar manner.

Figure 7:
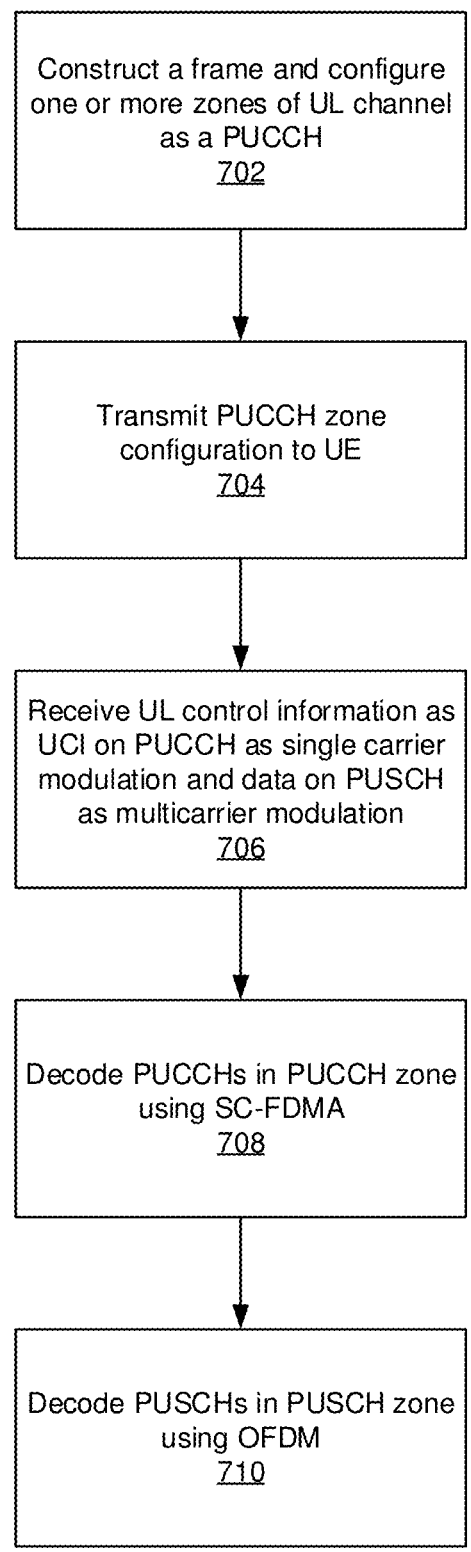
FIG. 7 illustrates a flow diagram for communicating on an uplink channel from a base station.

FIG. 7 illustrates a flow diagram for communicating data and control information on an uplink channel in a wireless communication system. The process described below is implemented by the base station and/or user equipment (UE), such as base station 110 and UEs 102, 104, 106, 108 of FIG. 1 and components, such as those described with reference to FIG. 2.

At 702, the base station 110 constructs a frame (or receives the constructed frame from the network), such as the radio frame depicted in FIG. 3, to communicate symbols between a base station 110 and user equipment, such as 102, 104, 106 and 108. As appreciated, the frame includes an uplink subframe to communicate symbols from the user equipment UE to the base station 110.

The base station 110 then configures one or more zones of an uplink channel in the uplink subframe using a signaling message (or receives the configuration from the network) at 704. Alternatively, the zones could be pre-configured at the UE based on, e.g., a UE ID. As depicted for example in FIGS. 5A and 5B, one of the zones in the uplink channel is configured as a physical uplink control channel (PUCCH) for transmission of control information, and another of the zones is configured as a physical uplink shared channel (PUSCH) for transmission of data information. However, whereas in FIG. 5B the PUCCH zones are configured at either edge of the bandwidth (as in existing LTE releases), the PUCCH zones in FIG. 5A are not limited to such narrow UL bandwidth configuration. Thus, the PUCCH zones may have varying UL bandwidths. The signaling message, as will be described in more detail below, may be for example an RRC message or a DCI.

Once the PUCCH zones have been configured, the base station 110 may transmit the PUCCH zone configuration to the user equipment UE. In response to receiving the PUCCH zone configuration, the UE sends uplink control information (UCI) on the PUCCH resource using a single carrier modulation and data on the PUSCH resource using a multicarrier modulation. The UCI and data are received by the base station 110 at 706.

At 708, the base station 110 decodes the UCI on the PUCCH resource in the PUCCH zone using the single carrier modulation, and at 710 the base station 110 decodes the data on the PUSCH resource in the PUSCH zone using multi-carrier modulation. When performing decoding, the base station 110 determines the total number of bits of the original information of UCI (Uplink Control Information) joint channel coding adopted by a UE. This ensures that the base station 110 and UE understand the total number of bits of the original information of UCI joint coding of multiple downlink carriers, so as to perform correct decoding.

Implementing the PUCCH zone requires additional signaling, as noted above. In one embodiment, the signaling message may be an RRC message. The RRC message can be common (SIB) or dedicated a dedicated message. One advantage to using a dedicated RRC message is that the configured zones can be different on a per user basis. RRC messaging may be particularly relevant, for example, when the number of UEs is large (e.g., machine-to-machine communication devices). The RRC message may include: (1) a bitmap to indicate on which microframes the legacy PUCCH zones are used, and on which microframes the newly configured PUCCH zones are used. The bitmap length may be, for example the same as the bitmap length used for a multicast-broadcast single-frequency network (MBSFN) configuration (10 subframes or 40 subframes); (2) a list of RBs for the newly configured PUCCH zone. For example, as a bitmap similar that used in the enhanced physical downlink control channel (EPDCCH) or using a specific resource allocation type, such as that used in the relay physical downlink control channel (R-PDCCH); (3) a UE or cell specific offset to indicate on which resource to start; and (4) a specified format in accordance with the current standard.

In another embodiment, the signaling message is the DCI used indicate where the PUCCH is located. For example, (1) a new DCI format may be used to convey the same information as the described RRC messages. This new DCI could use a format similar to the DCI in the enhanced interference mitigation and traffic adaptation (eIMTA) signaling; or (2) when a UE receives an assignment through an existing DCI (e.g., using any of the formats, such as formats 1, 1A, 1B, 1C, 1D, 2, 2A, etc.), a field may be added to indicate the PUCCH zone(s). In this embodiment, the UE would use the signaled PUCCH zones to send the UCI, if needed. However, in order to limit the DCI overhead, a few pre-configurations may be applied or may be communicated in advance through RRC signaling. For example, each PUCCH zone is allocated an index, and only the index corresponding to the PUCCH zone is signaled in the DCI.

Figure 8:
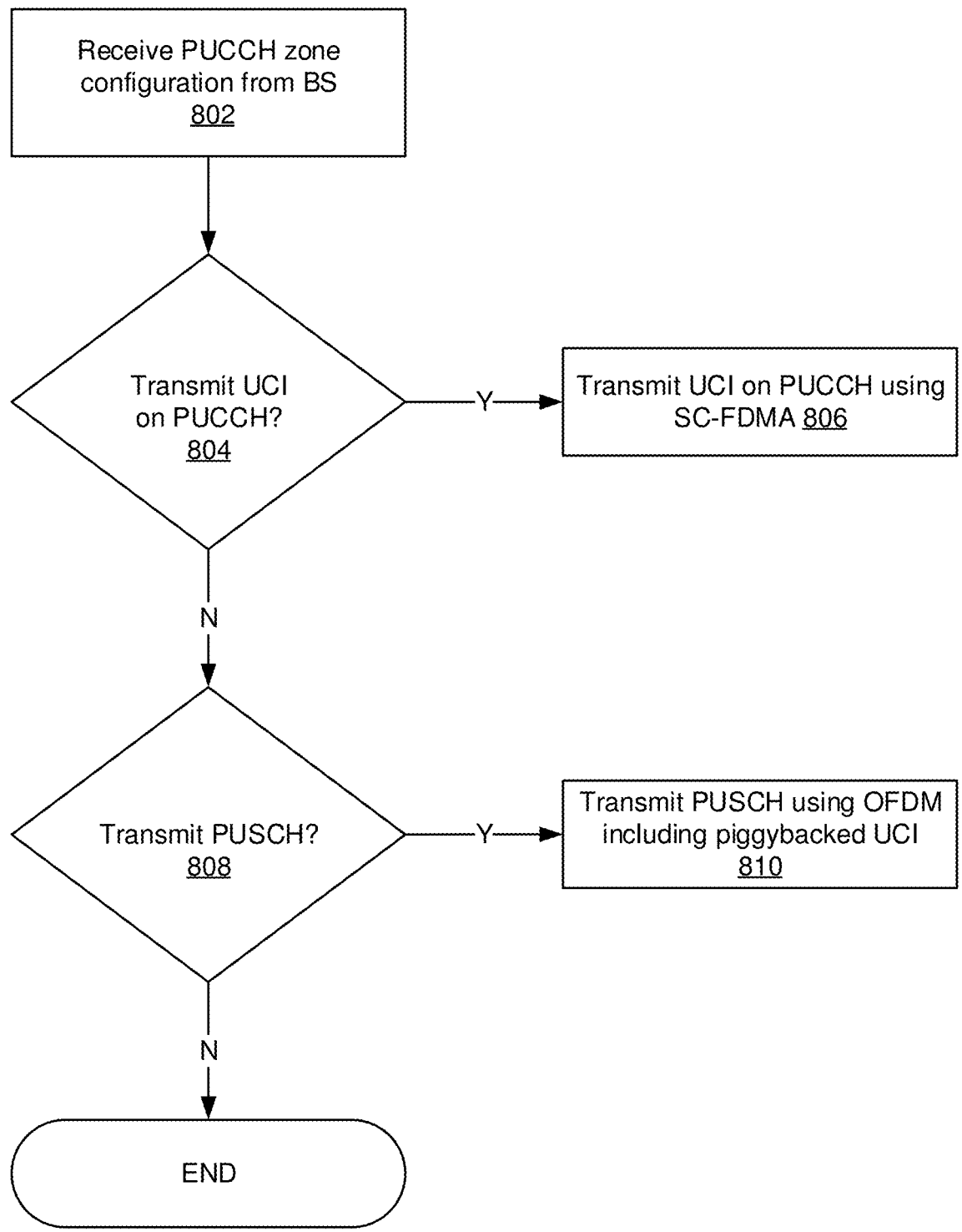
FIG. 8 illustrates a flow diagram for communicating on an uplink channel from user equipment.

FIG. 8 illustrates a flow diagram for communicating on an uplink channel from user equipment. The process described below is implemented by the UE, such as 102, 104, 104 and 108 of FIG. 1 and components, such as those described with reference to FIG. 2.

At 802, the UE receives the PUCCH zones configured by the base station 110. In response to receiving the PUCCH zone configuration, the UE determines whether to transmit uplink control information (UCI) on the PUCCH resource at 804. In determining whether to transmit the UCI on the PUCCH resource, the UE determines whether any UCI is required to be transmitted and/or whether any data is being transmitted. When no UCI is being transmitted on the PUCCH resource or data is being transmitted on the PUSCH resource, the process continues to 808. Otherwise, when UCI is being transmitted, the UE transmits the UCI on the PUCCH resource using a single carrier modulation, such as SC-FDMA.

If the UE determines that data is being transmitted on the PUSCH resource at 808, then the data is transmitted by the UE to the base station 110 on the PUSCH resource. If UCI is also being transmitted, the UCI may be piggybacked during transmission on the PUSCH resource. In this case, as is apparent, there is no need to transmit the UCI on the PUCCH. Rather, the UE transmits the UCI piggybacked on the PUSCH resource using a multicarrier modulation, such as OFDM, at 810.

Prior to such transmission, the UE encodes the UCI on the PUCCH resource in the PUCCH zone using the single carrier modulation (when the PUCCH is being transmitted), or encodes the data on the PUSCH resource in the PUSCH zone using multi-carrier modulation (when no PUCCH is being transmitted). When performing decoding, the base station 110 determines the total number of bits of the original information of UCI (Uplink Control Information) joint channel coding adopted by a UE. This ensures that the base station 110 and UE understand the total number of bits of the original information of UCI joint coding of multiple downlink carriers, so as to perform correct decoding.

Figures 9A, 9B:
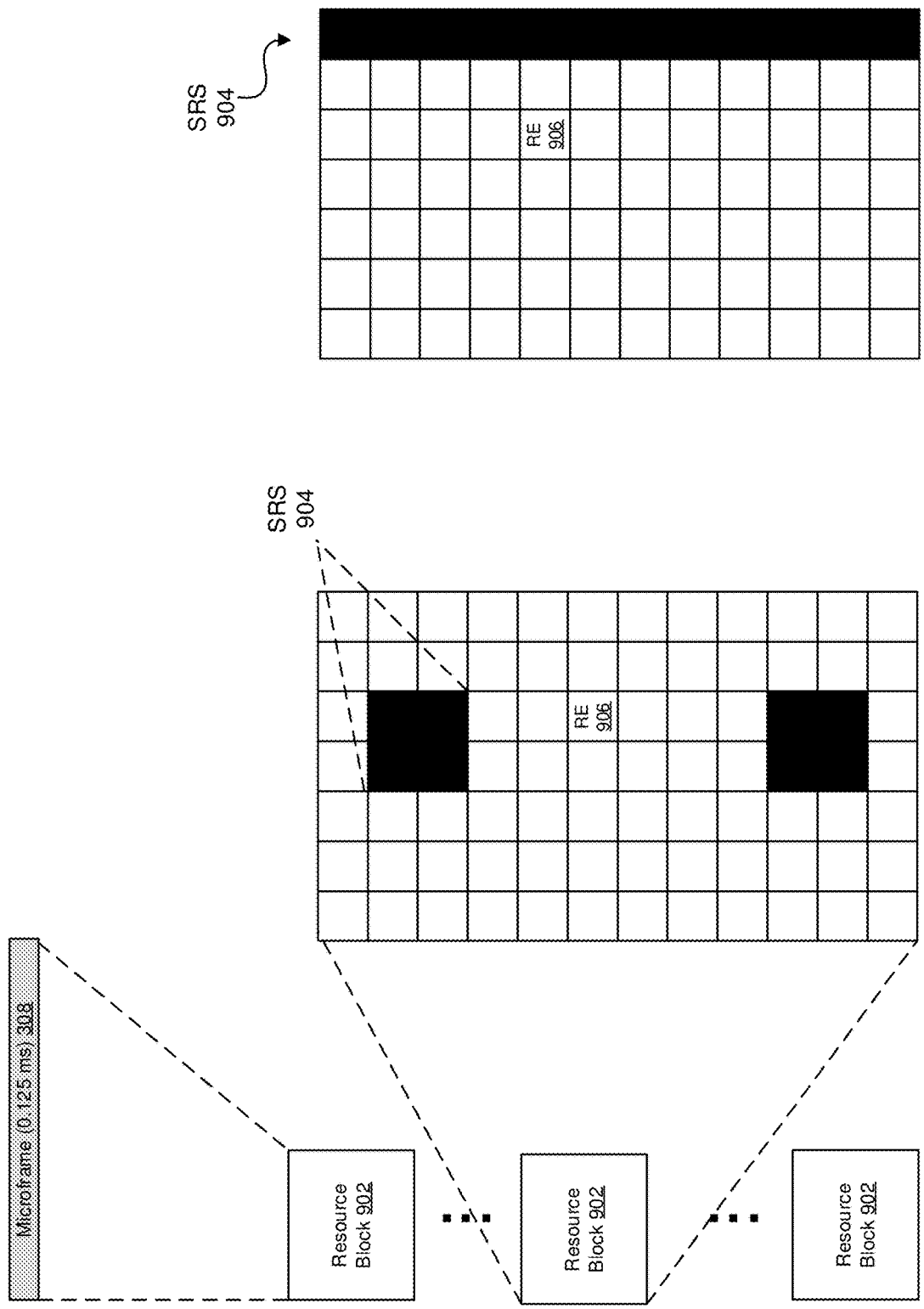
FIG. 9A illustrates a block diagram of a reference signal in PUCCH regions using OFDM.
FIG. 9B illustrates a block diagram of a reference signal in PUCCH regions using SC-FDMA.

FIG. 9A illustrates a block diagram of a reference signal in PUCCH regions using OFDM. The illustration shows a microframe 308 (which may also be a slot) that is comprised of a resource block RB 902 (or physical resource block PRB). While a single microframe 308 (slot) is illustrated, a second microframe 308 (slot) may have symmetry by slot-level hopping for the PUCCH. An RB 902 includes a set of REs 906 defined by specific time and frequency grids formed by orthogonal frequency division multiplexing (OFDM) symbols in time and subcarriers in frequency. These REs 906 are arranged into the afore-mentioned RBs 902, where each RB 902 includes common reference signal (CRS) REs that constitute a pilot or sounding reference signal (SRS) 904.

In LTE, contiguous REs 906 are used on a symbol (FIG. 3) to transmit the SRS 904 provided the use of SC-FDMA. When OFDM is used for PUSCH, there is no need to transmit such a signal, and the REs 906 used for SRS 904 may be placed in a different location in the RB 9002 used for PUSCH transmission. That is, the SRS is not dedicated to any one symbol. The SRS 904 signal can somewhat be analogous to the CSI-reference signal (RS) (CSI-RS). An example of possible location of the SRS 904 in a PRB carrying the PUSCH is shown in FIG. 9A.

FIG. 9B illustrates a block diagram of a reference signal in PUCCH regions using SC-FDMA. When the SRS 904 is transmitted on an RB 902 carrying the PUCCH, the SRS 904 is assigned to the last symbol, similar to the requirement in LTE. Thus, when the UE is not transmitting a PUCCH, the SRS 904 may be OFDM, and when the UE is transmitting a PUCCH, the SRS 904 is SC-FDMA.

Figure 10:
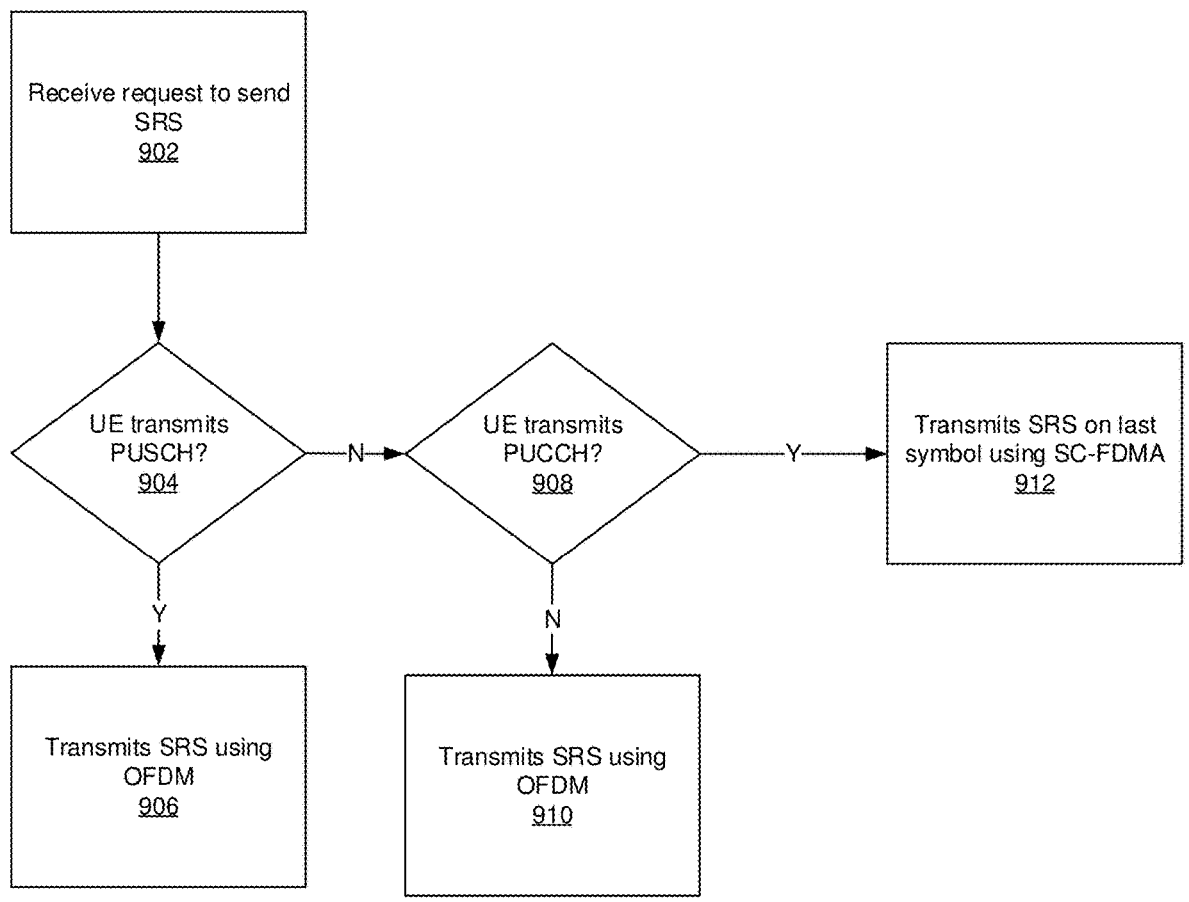
FIG. 10 illustrates a flow diagram of user equipment operation of sending a signaling message.

FIG. 10 illustrates a flow diagram of UE operation of sending an SRS. At 902, the UE receives the request from the base station 110 to send the SRS. If the UE determines that PUSCH in not being transmitted at 904 and PUCCH is being transmitted at 908, the UE applies the SRS on the last symbol of the RB encoded with SC-FDMA (FIG. 9B).

If the UE determines that PUCCH is not being transmitted at 908 (and PUSCH is not being transmitted as determined at 904), then the SRS is transmitted from the UE to the base station 110 on different symbols of the RB encoded with OFDM at 910 (FIG. 9A), thereby affording better channel estimation. If the UE determines at 904 that PUSCH is being transmitted to the base station 110, the SRS is transmitted from the UE to the base station 110 on different symbols of the RB encoded with OFDM at 910 (FIG. 9A), thereby affording better channel estimation.

Figure 11:
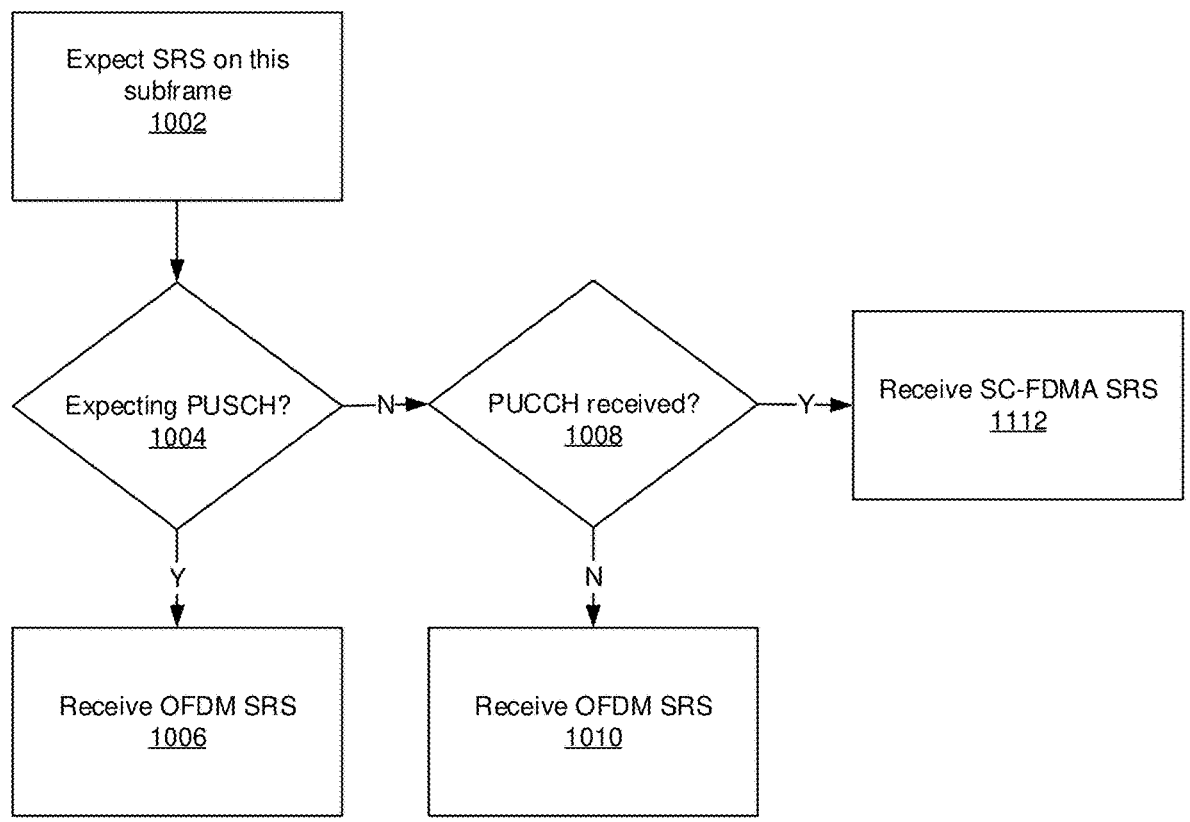
FIG. 11 illustrates a flow diagram of a base station operation of receiving a signaling message.

FIG. 11 illustrates a flow diagram of a base station operation receiving an SRS. At 1002, the base station 110 expects to receive a subframe including the SRS sent by the UE. That is, the base station 110 has previously scheduled the UE to send an SRS on the subframe and has knowledge (expects) the SRS to be received with the subframe. If the base station 110 is expecting receipt of a PUSCH at 1004, then the SRS is received in the PUSCH from the UE and decoded according to OFDM, at 1006. If the base station 110 determines that PUSCH in not expected at 1004 and PUCCH is being transmitted by the UE at 1008, the base station 110 retrieves the SRS from the last symbol of the RB by decoding with SC-FDMA (FIG. 9B).

If the base station 110 determines that PUCCH is not being transmitted by the UE at 1008 (and PUSCH is not being transmitted as determined at 1004), then the SRS is received from the UE at the base station 110 on different symbols of the RB having been encoded with OFDM at 1010 (FIG. 9A), thereby affording better channel estimation. If the base station 110 determines at 1004 that PUSCH is expected to be received from the UE, then the SRS is received from the UE at the base station 110 on different symbols of the RB having been encoded with OFDM at 1010 (FIG. 9A), thereby affording better channel estimation.

In another embodiment, subframes/microframes may be configured with an existing LTE SRS, and other subframes/microframes may be configured with an OFDM/SC-FDMA SRS structure, as previously described. This type of configuration may be signaled, for example, by RRC signaling. When the UE transmits the SRS using OFDM, the UEs transmitting the PUSCH have to "mute" the REs where the SRS is to be transmitted. When and where to mute is first signaled using one of the following methodologies: (1) all UEs may use the same muting pattern on a given subframe/microframe. In this context, the muting pattern is similar to a CSI-RS zero power (ZP) pattern and applies to each of the RBs of the PUSCH zone. The pattern can be signaled by RRC signaling, either common or dedicated, in a similar manner that the ZP CSI-RS pattern is signaled; or (2) the pattern could be signaled when applied by adding one or more bits in the DCI to signal the pattern. When the UE receives the DCI, it may decode these bits and determine whether it should mute the SRS REs. If muting is required, the UE may either puncture them or rate-match them (depending on the standard).

Figure 12:
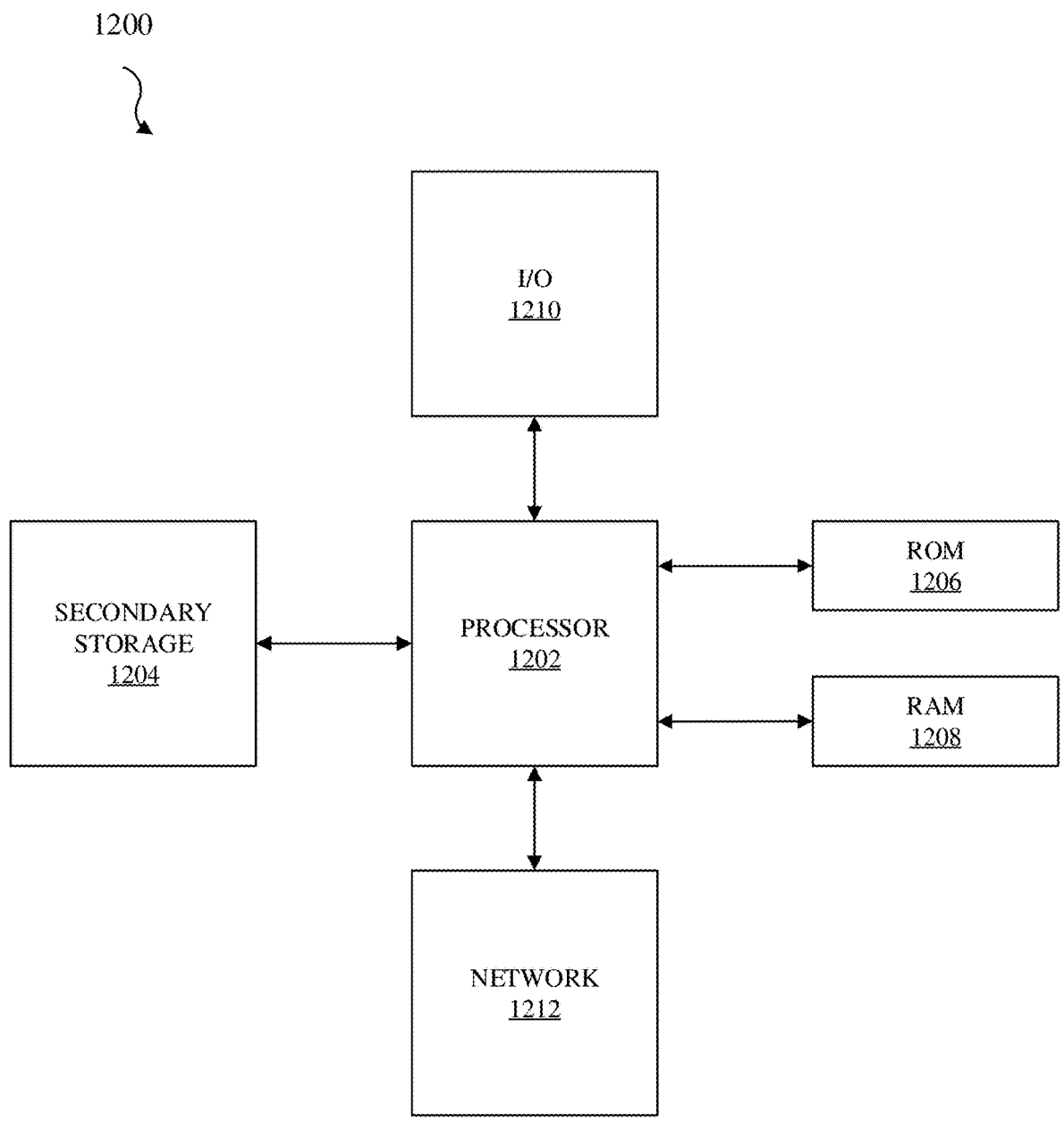
FIG. 12 illustrates a block diagram of a network system that can be used to implement various embodiments.

The schemes described above may be implemented on any general-purpose network component, such as a computer or network component with sufficient processing power, memory resources, and network throughput capability to handle the necessary workload placed upon it. FIG. 12 illustrates a schematic diagram of a general-purpose network component or computer system. The general-purpose network component or computer system 1200 includes a processor 1202 (which may be referred to as a central processor unit or CPU) that is in communication with memory devices including secondary storage 1204, and memory, such as ROM 1206 and RAM 1208, input/output (I/O) devices 1210, and a network 1212, such as the Internet or any other well-known type of network, that may include network connectively devices, such as a network interface. Although illustrated as a single processor, the processor 1202 is not so limited and may comprise multiple processors. The processor 1202 may be implemented as one or more CPU chips, cores (e.g., a multi-core processor), FPGAs, ASICs, and/or DSPs, and/or may be part of one or more ASICs. The processor 1202 may be configured to implement any of the schemes described herein, including the processes described with reference to FIGS. 7, 8, 10 and 11. The processor 1102 may be implemented using hardware, software, or both.

The secondary storage 1204 is typically comprised of one or more disk drives or tape drives and is used for non-volatile storage of data and as an over-flow data storage device if the RAM 1108 is not large enough to hold all working data. The secondary storage 1204 may be used to store programs that are loaded into the RAM 1208 when such programs are selected for execution. The ROM 1206 is used to store instructions and perhaps data that are read during program execution. The ROM 1206 is a non-volatile memory device that typically has a small memory capacity relative to the larger memory capacity of the secondary storage 1204. The RAM 1208 is used to store volatile data and perhaps to store instructions. Access to both the ROM 1206 and the RAM 1208 is typically faster than to the secondary storage 1204. At least one of the secondary storage 1204 or RAM 1208 may be configured to store routing tables, forwarding tables, or other tables or information disclosed herein.

It is understood that by programming and/or loading executable instructions, for example, onto a node, the processor or memory are changed (individually or collectively referred to as computer readable media, medium or storage), transforming the node in part into a particular machine or apparatus, e.g., a radio network node, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hard-wires the instructions of the software. In the same manner as a machine controlled by a new ASIC is a particular machine or apparatus, likewise a computer that has been programmed and/or loaded with executable instructions may be viewed as a particular machine or apparatus.

The present disclosure provides, among others, the following advantages. Scalability since the UEs do not need to support the maximum UL bandwidth. Moreover, in existing LTE designs, all UEs must have the same UL bandwidth. Additionally, there is interference avoidance on the PUCCH regions (eICIC) and beamforming on the PUCCH regions.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method performed by a base station, comprising:
configuring a physical uplink control channel (PUCCH) resource and a physical uplink shared channel (PUSCH) resource on an uplink, the PUCCH resource on the uplink being configured for transmission of control information through a single-carrier orthogonal frequency-division multiplexing (OFDM) and the PUSCH resource on the uplink is configured for transmission of data information through a multicarrier OFDM;
transmitting a PUCCH resource configuration and a PUSCH resource configuration to a user equipment (UE) using radio resource control (RRC) signaling;
receiving from the UE, on the uplink, the PUCCH resource modulated in the single-carrier OFDM and the PUSCH resource modulated in the multicarrier OFDM, the PUCCH resource carrying uplink control information (UCI) using the single carrier OFDM, and the PUSCH resource carrying the data using the multicarrier OFDM;
obtaining the UCI on the PUCCH resource using the single carrier OFDM and the data on the PUSCH resource using the multicarrier OFDM;
multiplexing a plurality of PUCCH resources which are allocated to a plurality of UEs, with each of the plurality of UEs being allocated a single PUCCH resource of the plurality of PUCCH resources, the multiplexing including code multiplexing and frequency multiplexing; and
mapping at least two of the plurality of PUCCH resources with a first resource block having a first index in a first time resource and a second resource block having a second index in a second time resource.

2. The method of claim 1, wherein the uplink includes one or more microframes, where each microframe includes one or more symbols, and the microframes are formatted such that one or more zones of each microframe are arranged to alternate between the PUCCH resource and PUSCH resource.

3. The method of claim 1, wherein the base station is in a long term evolution (LTE) wireless communications system.

4. The method of claim 1, wherein the PUCCH resource is included in a plurality of PUCCH zones comprising a legacy PUCCH zone and an enhanced PUCCH zone, the RRC signaling includes at least one of: a bitmap indicating one or more time resources in which the legacy PUCCH zone is used and the time resources in which the enhanced PUCCH zone is used, a list of resource bocks for the enhanced PUCCH zone, a cell specific offset indicating a beginning resource, or a format of the enhanced PUCCH zone.

5. The method of claim 1, wherein the RRC signaling includes at least one of: an enhanced interference mitigation and traffic adaptation (eIMTA) signaling format, or an additional field including an index of the PUCCH resource in which to send the UCI.

6. The method of claim 1, wherein the UCI of the PUCCH resource is piggybacked onto the PUSCH resource.

7. The method of claim 6, further comprising:
sending a request to the UE for the uplink control information; and
in response to receiving the UCI on the PUCCH resource, receiving the uplink control information using the single carrier OFDM; or
in response to the receiving the UCI piggybacked on to the PUSCH resource, receiving the uplink control information using the multicarrier OFDM.

8. The method of claim 1, wherein
in response to receiving a sounding reference signal on the PUSCH or failing to receive the sounding reference signal on the PUCCH, retrieving the sounding reference signal from different symbols in a resource block and decoding the sounding reference signal with the multicarrier OFDM.

9. The method of claim 1, wherein
retrieving, in response to failing to receive a sounding reference signal on the PUSCH and receiving the sounding reference signal on the PUCCH, the sounding reference signal from a last symbol in a resource block and decoding the sounding reference signal with the single carrier OFDM.

10. A node, comprising:
a memory storage comprising instructions; and
one or more processors coupled to the memory storage that execute the instructions to:
configure a physical uplink control channel (PUCCH) resource and a physical uplink shared channel (PUSCH) resource on an uplink, wherein the PUCCH resource on the uplink is configured for transmission of control information through a single-carrier orthogonal frequency-division multiplexing OFDM and the PUSCH resource on the uplink is configured for transmission of data information through a multicarrier OFDM;
transmit a PUCCH resource configuration and a PUSCH resource configuration to a user equipment (UE) using radio resource control (RRC) signaling;
receive from the UE, on the uplink, the PUCCH resource modulated in the single-carrier OFDM and the PUSCH resource modulated in the multicarrier OFDM, wherein the PUCCH resource carries uplink control information (UCI) using the single carrier OFDM, and the PUSCH resource carries the data using the multicarrier OFDM;
obtain the UCI on the PUCCH resource using the single carrier OFDM and the data on the PUSCH resource using the multicarrier OFDM;
multiplex a plurality of PUCCH resources which are allocated to a plurality of UEs, with each of the plurality of UEs being allocated a single PUCCH resource of the plurality of PUCCH resources, wherein the multiplexing includes code multiplexing and frequency multiplexing; and
map at least two of the plurality of PUCCH resources with a resource block having an index in a first time resource and a resource index in a second time resource.

11. The node of claim 10, wherein the uplink includes one or more microframes, where each microframe includes one or more symbols, and the microframes are formatted such that one or more zones of each microframe are arranged to alternate between the PUCCH resource and PUSCH resource.

12. The node of claim 10, wherein the node is in a long term evolution (LTE) wireless communications system.

13. The node of claim 10, wherein the PUCCH resource are included in a plurality of PUCCH zones comprising a legacy PUCCH zone and a enhanced PUCCH zone, the RRC signaling includes at least one of: a bitmap indicating one or more time resources in which the legacy PUCCH zone is used and the time resources in which enhanced PUCCH zone is used, a list of resource blocks for the enhanced PUCCH zone, a cell specific offset indicating a beginning resource, or a format of the enhanced PUCCH zone.

14. The node of claim 10, wherein the RRC signaling includes at least one of: an enhanced interference mitigation and traffic adaptation (eIMTA) signaling format, or an additional field including an index of the PUCCH resource in which to send the UCI.

15. The node of claim 10, wherein the UCI of the PUCCH resource is piggybacked onto the PUSCH resource.

16. The node of claim 15, wherein the one or more processors coupled to the memory storage execute the instructions to:
send a request to the UE for the uplink control information; and
in response to receiving the UCI on the PUCCH resource, receive the uplink control information using the single carrier OFDM; and
in response to the receiving the UCI piggybacked on to the PUSCH resource, receive the uplink control information using the multicarrier OFDM.

17. The node of claim 10, wherein the one or more processors coupled to the memory storage execute the instructions to:
in response to one of receiving a sounding reference signal on the PUSCH and failing to receive the sounding reference signal on the PUCCH, retrieve the sounding reference signal from different symbols in a resource block and decoding the sounding reference signal with the multicarrier OFDM.

18. The node of claim 10, wherein the one or more processors coupled to the memory storage execute the instructions to:
retrieve, in response to failing to receive a sounding reference signal on the PUSCH and receiving the sounding reference signal on the PUCCH, the sounding reference signal from a last symbol in a resource block and decoding the sounding reference signal with the single carrier OFDM.

19. A non-transitory computer-readable medium storing computer instructions for identifying a root cause of anomalous behavior in a communications network, that when executed by one or more processors, perform the steps of:
configuring a physical uplink control channel (PUCCH) resource and a physical uplink shared channel (PUSCH) resource on an uplink, wherein the PUCCH resource on the uplink is configured for transmission of control information through a single-carrier orthogonal frequency-division multiplexing (OFDM) and the PUSCH resource on the uplink is configured for transmission of data information through a multicarrier OFDM;

transmitting a PUCCH resource configuration and a PUSCH resource configuration to a user equipment (UE) using radio resource control (RRC) signaling;

receiving from the UE, on the uplink, the PUCCH resource modulated in the single-carrier OFDM and the PUSCH resource modulated in the multicarrier OFDM, wherein the PUCCH resource carries uplink control information (UCI) using the single carrier OFDM, and the PUSCH resource carries the data using the multicarrier OFDM;

obtaining the UCI on the PUCCH resource using the single carrier OFDM and the data on the PUSCH resource using the multicarrier OFDM multiplexing a plurality of PUCCH resources which are allocated to a plurality of UEs, with each of the plurality of UEs being allocated a single PUCCH resource of the plurality of PUCCH resources, the multiplexing including code multiplexing and frequency multiplexing; and mapping at least two of the plurality of PUCCH resources with a first resource block having a first index in a first time resource and a second resource block having a second index in a second time resource.

* * * * *